(12) United States Patent
Terashima (10) Patent No.: US 9,887,430 B2
(45) Date of Patent: Feb. 6, 2018

(54) LITHIUM SECONDARY BATTERY AND POSITIVE ELECTRODE ACTIVE MATERIAL FOR THE LITHIUM SECONDARY BATTERY

(75) Inventor: Junpei Terashima, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 275 days.

(21) Appl. No.: 13/635,742

(22) PCT Filed: Mar. 19, 2010

(86) PCT No.: PCT/JP2010/054886
§ 371 (c)(1),
(2), (4) Date: Sep. 18, 2012

(87) PCT Pub. No.: WO2011/114534
PCT Pub. Date: Sep. 22, 2011

(65) Prior Publication Data
US 2013/0015396 A1    Jan. 17, 2013

(51) Int. Cl.
*H01M 4/505* (2010.01)
*H01M 4/525* (2010.01)
*H01M 10/052* (2010.01)
*C01G 53/00* (2006.01)
*H01M 4/58* (2010.01)

(52) U.S. Cl.
CPC ......... *H01M 10/052* (2013.01); *C01G 53/44* (2013.01); *H01M 4/505* (2013.01); *H01M 4/525* (2013.01); *C01P 2002/72* (2013.01); *C01P 2004/61* (2013.01); *C01P 2006/12* (2013.01); *H01M 4/5825* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2002/0142224 A1 | 10/2002 | Kweon et al. | |
| 2005/0048371 A1 | 3/2005 | Nagayama et al. | |
| 2005/0112466 A1 | 5/2005 | Jordy et al. | |
| 2005/0136329 A1 | 6/2005 | Howard, Jr. et al. | |
| 2005/0142442 A1* | 6/2005 | Yuasa et al. | 429/220 |

(Continued)

FOREIGN PATENT DOCUMENTS

| | | |
|---|---|---|
| EP | 1 391 950 A1 | 2/2004 |
| JP | 10-134812 | 5/1998 |

(Continued)

OTHER PUBLICATIONS

International Search Report in International Application No. PCT/JP2010/054886; dated Jun. 22, 2010.

*Primary Examiner* — Jonathan Crepeau
(74) *Attorney, Agent, or Firm* — Finnegan, Henderson, Farabow, Garrett & Dunner, LLP

(57) ABSTRACT

The present invention provides a lithium secondary battery having a positive electrode provided with a positive electrode active material formed of a lithium-manganese complex oxide represented by the general formula $$Li_x(Mn_aCo_bNi_c)_{2-x-y}M_yO_2 \quad (1)$$

(where, a, b, and c are $0<a<0.65$, $0\leq b$, and $0\leq c$, and x and y are $0<x<1.3$ and $0<y<0.05$), with the element M being an element that has a larger bond energy with oxygen than Mn, Co, or Ni.

7 Claims, 4 Drawing Sheets

(56) References Cited

U.S. PATENT DOCUMENTS

| | | |
|---|---|---|
| 2006/0105241 A1 | 5/2006 | Tode et al. |
| 2007/0026311 A1* | 2/2007 | Obana .................. H01M 4/525 |
| | | 429/217 |
| 2007/0218359 A1 | 9/2007 | Shimizu et al. |
| 2008/0160412 A1 | 7/2008 | Kasamatsu et al. |
| 2008/0241647 A1 | 10/2008 | Fukui et al. |

FOREIGN PATENT DOCUMENTS

| | | |
|---|---|---|
| JP | 10-321216 | 12/1998 |
| JP | 2002-75358 | 3/2002 |
| JP | 2002-237301 | 8/2002 |
| JP | 2002-279991 | 9/2002 |
| JP | 2003-168430 | 6/2003 |
| JP | 2003-317806 | 11/2003 |
| JP | 2005-78991 | 3/2005 |
| JP | 2005-150093 | 6/2005 |
| JP | 2005-259617 | 9/2005 |
| JP | 2006-164934 | 6/2006 |
| JP | 2006-202647 | 8/2006 |
| JP | 2006-294597 | 10/2006 |
| JP | 2007-165026 | 6/2007 |
| JP | 2007-516583 | 6/2007 |
| JP | 2007-242581 | 9/2007 |
| JP | 2008-235148 | 10/2008 |
| JP | 2008-243661 | 10/2008 |
| JP | 2008-270086 | 11/2008 |
| JP | 2008-288112 | 11/2008 |
| JP | 2008-293988 | 12/2008 |
| JP | 2009-266791 | 11/2009 |
| JP | 2010-73686 | 4/2010 |
| WO | WO 2006/134833 * | 12/2006 |

* cited by examiner

LITHIUM SECONDARY BATTERY AND POSITIVE ELECTRODE ACTIVE MATERIAL FOR THE LITHIUM SECONDARY BATTERY

CROSS-REFERENCE TO RELATED APPLICATIONS

This application is a national phase application of International Application No. PCT/JP2010/054886, filed Mar. 19, 2010, the content of which is incorporated herein by reference.

TECHNICAL FIELD

The present invention relates to a lithium secondary battery, e.g., a lithium ion battery, and to a positive electrode active material well suited for use in the positive electrode of this lithium secondary battery. The present invention further relates to a method of producing this positive electrode active material. More particularly, the present invention relates to a positive electrode active material formed of a lithium-containing complex oxide that has a layered rocksalt-type crystal structure, and also relates to a lithium secondary battery having the positive electrode provided with this positive electrode active material.

BACKGROUND ART

Secondary batteries, e.g., lithium secondary batteries and nickel hydride batteries, have become increasingly important in recent years as power sources mounted in electricity-driven vehicles and as power sources installed in personal computers, portable terminals, and other electrical products. In particular, lithium secondary batteries (typically lithium ion batteries), which provide a high energy density at a low weight, are expected to be preferentially used as vehicle-mounted high output power sources.

A lithium secondary battery contains electrodes that have a structure in which a material capable of reversibly incorporating and discharging the lithium ion, which acts as the charge carrier, is borne on an electroconductive member (electrode current collector), and investigations are underway into electrode active materials in order to realize even higher energy densities and higher outputs. Lithium-containing complex oxides having a layered rocksalt-type crystalline structure and lithium-containing complex oxides having a spinel-type crystalline structure are examples of the positive electrode active materials used in the positive electrodes of lithium secondary batteries. Examples which contain lithium (Li) and at least one transition metal element are lithium-nickel complex oxides, lithium-cobalt complex oxides, and lithium-manganese complex oxides, and also lithium-nickel-cobalt-manganese complex oxides in which atoms of each of nickel, cobalt, and manganese are located at non-lithium metal sites in the aforementioned crystalline structures. Attention has been directed to the lithium-nickel-cobalt-manganese complex oxides in particular because they exhibit an excellent thermal stability and provide a high energy density. As prior art related to such positive electrode active materials for lithium secondary batteries, various lithium-containing complex oxides having a layered rocksalt-type crystalline structure are disclosed in Patent Documents 1 and 2.

CITATION LIST

Patent Literature

Patent Document 1: Japanese Patent Application Laid-open No. 2008-288112

Patent Document 2: Japanese Patent Application Laid-open No. 2008-243661

The applications of lithium secondary batteries are expected to include long-term use in a repetitive high-rate charge-discharge (so-called high current charge-discharge) regime. However, a problem with lithium secondary batteries that use a lithium-manganese complex oxide with a rocksalt-type crystalline structure for their positive electrode active material is that the Mn in the crystal lattice elutes under the heat experienced within the battery during use in a repetitive high-rate charge-discharge regime. When the Mn elutes, a substantial decline in capacity occurs caused by a decline in the lithium transport rate within the positive electrode active material and a retardation of the charge transfer reaction between the positive electrode and the electrolyte. As a consequence, a positive electrode active material is desired that, even when used in high-rate charge-discharge, does not exhibit a decline in the lithium transport rate and can maintain a high capacity.

SUMMARY OF INVENTION

The present invention was achieved in view of these points, and its main objects are to provide a positive electrode active material for a lithium secondary battery, this positive electrode active material being resistant to a deterioration in capacity even when used for high rate charge-discharge, and to provide a method of producing this positive electrode active material. A further object is to provide a lithium secondary battery having a positive electrode that contains such a positive electrode active material.

In order to realize the objects indicated above, the present invention provides a positive electrode active material formed of a lithium-manganese complex oxide represented by the general formula $$Li_x(Mn_aCo_bNi_c)_{2-x-y}M_yO_2 \quad (1)$$

(where, a, b, and c are $0<a<0.65$, $0\leq b$, and $0\leq c$; x and y are $0<x<1.3$ and $0<y<0.05$; and typically $a+b+c=2-x-y$.), the positive electrode active material being characterized in that the element M in formula (1) is an element that has a larger bond energy with oxygen than Mn, Co, or Ni.

The present invention also provides a lithium secondary battery in which the positive electrode active material described above is incorporated in the positive electrode.

In this Description, "lithium secondary battery" refers to a secondary battery that uses the lithium ion as the electrolyte ion and that realizes charge and discharge by charge transfer with the lithium ion between the positive and negative electrodes. The secondary battery generally known as a lithium ion battery is a typical example encompassed by the lithium secondary battery in this Description.

In this Description, the "positive electrode active material" refers to an active material at the positive electrode, this active material having the ability to reversibly incorporate and release (typically insertion and desorption) a chemical species (for example, the lithium ion) that serves as a charge carrier in the secondary battery.

The positive electrode active material comprising a lithium-manganese complex oxide and provided in the positive electrode of the lithium secondary battery disclosed herein is represented by formula (1) $Li_x(Mn_aCo_bNi_c)_{2-x-y}M_yO_2$ and is characterized in that the element M in this formula (1) is an element that has a larger bond energy with oxygen than Mn, Co, or Ni.

It has been a concern here that a so-called lithium-manganese complex oxide that is a lithium-containing complex oxide that contains manganese (at a high manganese content) would, as a positive electrode active material, more readily exhibit elution of the Mn in the crystal lattice when the interior of the battery experiences heating, than would other lithium complex oxides containing mainly cobalt or nickel, and thus would exhibit a reduced discharge capacity. However, the production costs can be kept down with a lithium secondary battery that uses as its positive electrode active material a lithium-manganese complex oxide have a high content of inexpensive manganese. As a consequence, there has been demand for a positive electrode active material for a lithium secondary battery wherein this positive electrode active material would comprise a lithium-manganese complex oxide that would be resistant to a decline in capacity even during high-rate charge-discharge duty. The present inventor discovered that the Mn in the crystal lattice resists elution, even during high-rate charge-discharge duty, when an element with a larger bond energy with oxygen than Mn, Co, or Ni is added as a trace element M to the lithium-manganese complex oxide. This improves the thermal stability of the lithium secondary battery and inhibits the decline in the lithium transport rate within the positive electrode active material and the electron transfer reaction between the positive electrode and the electrolyte, and as a consequence inhibits the decline in the discharge capacity. Accordingly, a lithium secondary battery that exhibits excellent battery characteristics (for example, high-rate characteristics or cycle characteristics) can be provided by the use of the positive electrode active material disclosed herein. A lithium secondary battery provided with a positive electrode having the herein disclosed positive electrode active material thus becomes a battery in which the discharge capacity decline is inhibited even during use in a repetitive high-rate charge-discharge regime.

In a preferred aspect of the herein disclosed lithium secondary battery, a positive electrode active material in which a in formula (1) is a number that satisfies $0.33<a<0.65$ is provided as the aforementioned positive electrode active material.

An even better thermal stability is exhibited by a positive electrode active material that is constructed so the content of the manganese present in the lithium-manganese complex oxide represented by formula (1) $Li_x(Mn_aCo_bNi_c)_{2-x-y}M_yO_2$ exceeds the cobalt and/or nickel content. By doing this, the lithium secondary battery constructed using such a positive electrode active material is able to maintain, even during high-rate charge-discharge duty, a high capacity without a decline in the lithium transport rate within the positive electrode active material and without a decline in the charge transfer reaction between the positive electrode and the electrolyte.

For the herein disclosed lithium-manganese complex oxide, in an X-ray diffraction pattern measured by a powder diffractometer (XRD), a peak attributable to an Mn-containing compound can be recognized typically at a position for $2\theta$ in the vicinity of approximately 22° (for example, 22°±1°). In addition, whether the lithium-manganese complex oxide forms a solid solution can be confirmed by the peak seen at a position for $2\theta$ in the vicinity of approximately 18° or 65° (for example, 18°±1°, 65°±1°).

In another preferred aspect of the herein disclosed lithium secondary battery, a positive electrode active material in which the element M in formula (1) is at least one or more elements selected from the group consisting of Al, Si, Ca, Sc, Ti, V, Cr, Fe, Ge, Sr, Y, Zr, Nb, Mo, Tc, Ru, Rh, the rare-earth lanthanoids, and the rare-earth actinoids is provided as the aforementioned positive electrode active material. In an even more preferred aspect of the lithium secondary battery, a positive electrode active material in which the element M in formula (1) is at least one or more elements selected from the group consisting of Al, Ca, Fe, and Zr is provided as the aforementioned positive electrode active material.

A lithium secondary battery that uses for its positive electrode active material a lithium-manganese complex oxide containing an element as listed above for the element M in formula (1), exhibits an approximately 30% increase in its discharge capacity over that of a lithium secondary battery that uses for its positive electrode active material a lithium-manganese complex oxide lacking the element M. This makes it possible as a result to provide a positive electrode active material for a lithium secondary battery that exhibits a high capacity even when used for high-rate charge-discharge.

In addition, in another aspect that realizes the objects cited above, the present invention provides a method of producing a positive electrode active material comprising a lithium-manganese complex oxide. The production method disclosed herein comprises the following steps: a step of preparing a starting material mixture by mixing, in an aqueous solvent, an organic acid and starting materials for forming a lithium-manganese complex oxide represented by the general formula $$Li_x(Mn_aCo_bNi_c)_{2-x-y}M_yO_2 \qquad (1)$$

(where, a, b, and c are $0<a<0.65$, $0\leq b$, and $0\leq c$; x and y are $0<x<1.3$ and $0<y<0.05$; and typically $a+b+c=2-x-y$.), with the element M being an element that has a larger bond energy with oxygen than Mn, Co, or Ni; a step of heating the starting material mixture and drying off the aqueous solvent; a step of pre-calcining the starting material mixture after the aqueous solvent has been dried off; and a step of grinding the pre-calcined material and calcining the same at a temperature higher than the pre-calcination temperature.

By preparing an element that has a larger bond energy with oxygen than Mn, Co, or Ni as a starting material for the trace element M in the preparation step described above, the lithium-manganese complex oxide yielded by the aforementioned method can then provide a positive electrode active material that exhibits an excellent thermal stability. As a consequence, elution of the Mn in the crystal lattice is inhibited, even during high-rate charge-discharge service, in a lithium secondary battery that uses such a lithium-manganese complex oxide for its positive electrode active material. Thus, the production method of the present invention makes it possible to produce a lithium secondary battery in which, even during high-rate charge-discharge service, the lithium transport rate within the positive electrode active material and the electron transfer reaction between the positive electrode and the electrolyte are facilitated and the capacity decline is thereby inhibited.

In another preferred aspect of the production method provided by the present invention, the starting materials are prepared in the aforementioned starting material mixture preparation step such that a in formula (1) is a number that satisfies $0.33<a<0.65$.

By preparing starting materials that bring the manganese component ratio into this range, a positive electrode active material comprising a lithium-manganese complex oxide can be produced that can maintain a high capacity even during high-rate charge-discharge service.

The preparation is preferred of the aforementioned starting materials such that the element M in formula (1) includes at least one or more elements selected from the group consisting of Al, Si, Ca, Sc, Ti, V, Cr, Fe, Ge, Sr, Y, Zr, Nb, Mo, Tc, Ru, Rh, rare-earth lanthanoids, and rare-earth actinoids.

A lithium secondary battery that uses a lithium-manganese complex oxide containing an element M as listed above has a discharge capacity that is approximately 30% larger than for a lithium-manganese complex oxide that does not contain the element M. Accordingly, this production method can produce a positive electrode active material for a lithium secondary battery wherein the positive electrode active material has a high capacity even during high-rate charge-discharge service.

In another preferred aspect, the pre-calcination in the pre-calcination step is carried out at 400 to 600° C. It is also preferred that calcination be carried out in the calcination step at a temperature above the pre-calcination temperature but at most 1000° C.

The density of the crystalline structure of the lithium-manganese complex oxide can be suitably raised by heating in the above-indicated range in the pre-calcination step or the calcination step. As a result, a lithium secondary battery that uses such a highly crystalline lithium-manganese complex oxide for its positive electrode active material then becomes a battery in which elution of the Mn in the crystal lattice is inhibited even during high-rate charge-discharge use. This serves to improve the thermal stability of the lithium secondary battery and thereby enables a high capacity to be maintained.

In another preferred aspect of the herein disclosed production method, the average particle size (median size) of the calcined material obtained after implementing the calcination step is 1 μm to 10 μm based on measurement of the particle size distribution by laser diffraction. In a preferred aspect, the BET specific surface area of the calcined material obtained after implementing the calcination step is at least 2 m²/g.

An excellent performance (capacity, high energy density) can be obtained when a calcined material having an average particle size or BET specific surface area in the ranges indicated above is used as the positive electrode active material in a battery subjected to long-term use in a repetitive high-rate charge-discharge regime.

The present invention also provides a vehicle that is equipped with the herein disclosed lithium secondary battery. The lithium secondary battery provided by the present invention can exhibit properties (for example, high-rate properties or cycle properties) that are particularly well favorable for the power source of an in-vehicle battery. Accordingly, the lithium secondary battery as disclosed herein is well qualified for use as a power source for a motor (electric motor) mounted in a vehicle, e.g., an automobile equipped with an electric motor such as a hybrid automobile or an electric automobile.

DESCRIPTION OF EMBODIMENTS

Preferred embodiments of the present invention are described in the following. Matters required for the execution of the present invention, but not included in the matters particularly described in this Description, can be understood as design matters for the individual skilled in the art based on the conventional art in the pertinent field. The present invention can be implemented based on the contents of this Description and the common general technical knowledge in the pertinent field.

The positive electrode active material provided by the present invention and comprising a lithium-manganese complex oxide is a positive electrode active material for a lithium secondary battery, wherein this positive electrode active material has a layered rocksalt-type crystalline structure and is a lithium-containing complex oxide for which manganese is an essential constituent element. This positive electrode active material is described in detail below, as is the method of producing this active material. Preferred embodiments of the lithium secondary battery provided with this positive electrode active material are also described, but the invention is not intended to be limited to these embodiments.

Embodiments of the positive electrode active material comprising the lithium-manganese complex oxide will be described first.

The positive electrode active material disclosed herein is represented by the following general formula.

$$Li_x(Mn_aCo_bNi_c)_{2-x-y}M_yO_2 \quad (1)$$

a, b, and c in formula (1) are 0<a<0.65, 0≤b, and 0≤c, and x and y in formula (1) are 0<x<1.3 and 0<y<0.05.

In addition, generally a+b+c=2−x−y or a+b+c≤2−x−y or a+b+c≲2−x−y can be satisfied. a+b+c≤1 is preferably satisfied.

The herein disclosed positive electrode active material comprises a lithium-manganese complex oxide that is represented by formula (1) and has a layered rocksalt-type crystalline structure. Moreover, the element M in formula (1) characteristically is an element that has a larger bond energy with oxygen than Mn, Co, or Ni.

The manganese content in the herein disclosed lithium-manganese complex oxide is greater than the cobalt and/or nickel content. The manganese component ratio is preferably 0<a<0.65 and more preferably 0.33<a<0.65 and ideally generally 0.5<a<0.65. A lithium secondary battery that uses as its positive electrode active material a lithium-manganese complex oxide that has a high content of inexpensive manganese offers many advantages, for example, the ability to keep the production costs down.

On the other hand, it has been a concern that the discharge capacity would decline with such a high-manganese lithium-manganese complex oxide having a layered rocksalt-type crystalline structure because, when the interior of the battery undergoes heating, the Mn in the crystal lattice will elute more easily than with other lithium complex oxides that contain mainly cobalt and/or nickel. However, as indicated in formula (1), an element that has a larger bond energy with oxygen than Mn, Co, or Ni is added as the trace element M in the herein disclosed lithium-manganese complex oxide. This serves to improve the thermal stability of the lithium secondary battery and to inhibit Mn elution even during repetitive high-rate charge-discharge duty. As a result, the lithium transport rate within the positive electrode active material and the electron transfer reaction between the positive electrode and the electrolyte are facilitated and the decline in the discharge capacity is thereby inhibited.

The element M in formula (1) is characteristically an element that has a larger bond energy with oxygen than Mn, Co, or Ni. Thus, an element M can be selected that has a larger M-O bond energy than the Mn—O bond energy (approximately 402.9±41.8 kJ/mol), Co—O bond energy (approximately 384.5±13.4 kJ/mol), or Ni—O bond energy (approximately 382.0±16.7 kJ/mol).

In specific terms, the element M in formula (1) can be exemplified by aluminum (Al), silicon (Si), calcium (Ca), scandium (Sc), titanium (Ti), vanadium (V), chromium (Cr), iron (Fe), germanium (Ge), strontium (Sr), yttrium (Y), zirconium (Zr), niobium (Nb), molybdenum (Mo), technetium (Tc), ruthenium (Ru), rhodium (Rh), any element belonging to the rare-earth lanthanoids, and any element belonging to the rare-earth actinoids. At least one or more elements selected from among the preceding may be added. Al, Ca, Fe, and Zr are particularly preferred elements. At least one or more elements from among these four elements may be added. Their bond energies with oxygen are, for example, 511±3 kJ/mol for the Al—O bond energy and 402.1±16.7 kJ/mol for the Ca—O bond energy, and the bond energy with oxygen is larger in each instance than that of Mn, Co, or Ni.

The component ratio (y) for the element M is generally 0<y<0.05, preferably 0.001<y<0.03, and particularly preferably 0.003<y<0.01. A lithium-manganese complex oxide to which the element M has been added in the indicated component ratio has a stable layered rocksalt-type crystalline structure and even at high temperatures is resistant to the elution of the Mn in the crystal lattice.

This lithium-manganese complex oxide can be confirmed by the x-ray diffraction pattern measured using a powder x-ray diffraction analyzer (XRD). A peak belonging to the Mn-containing compound can be recognized generally at a position for 2θ in the vicinity of approximately 22° (for example, 22°±1°). In addition, whether the lithium-manganese complex oxide forms a solid solution can be confirmed by the peak seen at a position for 2θ in the vicinity of approximately 18° or 65° (for example, 18°±1°, 65°±1°).

The herein disclosed positive electrode active material comprising the lithium-manganese complex oxide may be an oxide that contains nickel and/or cobalt in addition to manganese and the element M. The component ratio (b) for nickel and/or the component ratio (c) for cobalt are not particularly limited, but a content in a proportion smaller than the component ratio (a) for manganese is preferred.

The method of producing the positive electrode active material comprising the lithium-manganese complex oxide is described below.

The herein disclosed production method is a method of producing a positive electrode active material comprising a lithium-manganese complex oxide represented by the general formula (a, b, and c in formula (1) are 0<a<0.65, 0≤b, and 0≤c; x and y in formula (1) are 0<x<1.3 and 0<y<0.05; and typically a+b+c=2−x−y.), wherein the element M in formula (1) is an element that has a larger bond energy with oxygen than Mn, Co, or Ni.

Considered broadly, this production method comprises a step of preparing a starting material mixture by mixing an organic acid and the individual starting materials for forming formula (1); a step of heating the starting material mixture and drying off the aqueous solvent; a step of pre-calcining the starting material mixture after the aqueous solvent has been dried off; and a step of grinding the pre-calcined material and calcining it at a temperature higher than the pre-calcination temperature. A detailed description follows.

<The Starting Materials>

Starting materials for forming the lithium-manganese complex oxide with formula (1) are first prepared. A lithium source, a manganese source, and an element M source, which are the essential constituent elements, and a cobalt source and a nickel source, which are the elective constituent elements, are prepared as these starting materials.

Compounds that contain a lithium source should be capable of dissolving or uniformly dispersing in the aqueous solvent, but are not otherwise particularly limited, and various lithium compounds can be used. For example, lithium organic acid compounds, e.g., lithium acetate and lithium oxalate, and lithium inorganic acid compounds, e.g., lithium carbonate, lithium hydroxide, and lithium phosphate, may be used. A particularly preferred example is lithium acetate dihydrate ($Li(CH_3COO) \cdot 2H_2O$), which is readily soluble in aqueous solvents.

For example, manganese compounds such as manganese acetate, manganese oxalate, manganese carbonate, manganese oxide, manganese sulfate, manganese nitrate, manganese hydroxide, and manganese oxyhydroxide can be used as compounds that contain a manganese source. A particularly preferred example is manganese (II) acetate tetrahydrate ($Mn(CH_3COO)_2 \cdot 4H_2O$), which is readily soluble in aqueous solvents.

A compound containing an element M that has a larger bond energy with oxygen than Mn, Co, or Ni is also prepared as a starting material. The element M can be specifically exemplified by Al, Si, Ca, Sc, Ti, V, Cr, Fe, Ge, Sr, Y, Zr, Nb, Mo, Tc, Ru, Rh, any elements belonging to the rare-earth lanthanoids, and any elements belonging to the rare-earth actinoids. A compound containing at least one or more elements M from among these elements is preferred. A compound containing one or more elements M from among Al, Ca, Fe, and Zr is particularly preferred. This element M-containing compound should be soluble or uniformly dispersible in the aqueous solvent, but is not otherwise particularly limited, and, for example, acetates and oxalates containing the aforementioned element M are particularly preferred examples. The addition of a compound containing an element M as listed above to the starting materials makes it possible to produce a positive electrode active material for a lithium secondary battery wherein the positive electrode active material has an excellent thermal stability and can maintain a high capacity even during high-rate charge-discharge duty. The form of addition by this element M-containing compound can vary and can take a solid solution form and/or a surface coating form, but is not particularly limited.

Compounds that contain a source of cobalt, which is an elective constituent element, should be capable of dissolving or uniformly dispersing in the aqueous solvent, but are not otherwise particularly limited, and various cobalt compounds can be used. For example, cobalt acetate, cobalt oxalate, cobalt carbonate, cobalt oxide, cobalt sulfate, cobalt nitrate, cobalt hydroxide, and cobalt oxyhydroxide may be used. A particularly preferred example is cobalt (II) acetate tetrahydrate (Co(CH$_3$COO)$_2$.4H$_2$O), which is readily soluble in aqueous solvents.

Compounds that contain a source of nickel should be capable of dissolving or uniformly dispersing in the aqueous solvent, but are not otherwise particularly limited, and various nickel compounds can be used. For example, nickel acetate, nickel oxalate, nickel carbonate, nickel oxide, nickel sulfate, nickel nitrate, nickel hydroxide, and nickel oxyhydroxide may be used. A particularly preferred example is nickel (II) acetate tetrahydrate (Ni(CH$_3$COO)$_2$.4H$_2$O), which is readily soluble in aqueous solvents.

<Preparation of the Starting Material Mixture>

The organic acid and the individual starting materials prepared as described above are then weighed out and mixed in an aqueous solvent to prepare a starting material mixture.

With regard to the individual starting materials, the mixed amounts of the individual starting material are more preferably adjusted (weighed out) so as to produce the complex oxide with the general formula $$Li_x(Mn_aCO_bNi_c)_{2-x-y}M_yO_2 \quad (1)$$

(a, b, and c in formula (1) are 0<a<0.65, 0≤b, and 0≤c; x and y in formula (1) are 0<x<1.3 and 0<y<0.05; and typically a+b+c=2−x−y.). When this is done, the manganese source may be weighed out so as to provide a manganese component ratio of preferably 0<a<0.65, more preferably 0.33<a<0.65, and ideally generally 0.5<a<0.65. While there are no particular limitations on the lithium component ratio, the lithium source may be prepared so x in formula (1) satisfies 1<a<1.3 to provide an excess amount of lithium and the respective starting materials may be mixed. This makes possible the synthesis of a lithium-manganese complex oxide that can exhibit a high energy density at a high capacity.

An organic acid (gelling agent) can suitably be used here that dissolves or uniformly disperses in the aqueous solvent. Glycolic acid (C$_2$H$_4$O$_3$) is an example. Saccharides, fatty acids, and their salts can also be suitably used. The saccharides can be exemplified by monosaccharides, disaccharides, polysaccharides, and their derivatives. The monosaccharides can be exemplified by aldoses such as glucose, mannose, galactose, allose, talose, ribose, arabinose, erythrose, and threose; by ketoses such as fructose, tagatose, sorbose, ribulose, xylulose, and erythrulose; and by the pyranoses and furanoses that are their cyclic structures. The disaccharides can be exemplified by sucrose, lactose, and maltose, and the polysaccharides can be exemplified by starch and cellulose. The fatty acid can be exemplified by saturated aliphatic acids such as acetic acid and butyric acid; unsaturated fatty acids such as oleic acid, linoleic acid, and arachidonic acid; and other fatty acids such as phthalic acid, citric acid, isocitric acid, malic acid, tartaric acid, lactic acid, oxalic acid, and succinic acid. Saccharides such as sucrose and so forth are particularly suitable for use.

The aqueous solvent for mixing the starting materials is typically water, but may be a solvent that exhibits an aqueous character as a whole, and, for example, an aqueous solution containing a lower alcohol (e.g., methanol, ethanol, and so forth) is preferred. That is, water or a mixed solvent composed mainly of water is preferably used. One or two or more suitable selections from organic solvents capable of mixing uniformly with water (lower alcohols, lower ketones, and so forth) can be used as the solvent other than water that is present in this mixed solvent. For example, a solvent is preferably used in which at least about 80 mass % (more preferably at least about 90 mass % and even more preferably at least about 95 mass %) of the aqueous solvent is water. A solvent composed substantially of water is a particularly preferred example.

After the adjustment of the mass mixing ratios of the individual starting materials, these starting materials and the organic acid are added to the aqueous solvent and mixed and a thorough diffusion or impregnation is carried out to produce the starting material mixture. Stirring (including kneading and comminution) may be carried out as necessary during mixing. There are no particular limitations on the device used for mixing, but the starting material mixture can be uniformly diffused or impregnated by using, for example, a planetary mixer, planetary stirring device, disperser, ball mill, kneader, mixer, and so forth, and a stable mixed state can thereby be formed.

<The Drying Step>

The drying step is described in the following. In the drying step, the starting material mixture prepared as described above is dried in order to evaporate the aqueous solvent present in the starting material mixture. By drying in this step prior to calcination of the starting material mixture, only the aqueous solvent (or a portion thereof) is evaporated from the starting material mixture and the individual components are uniformly diffused or impregnated into a favorable state while inhibiting crystal growth. By doing this, the individual components can be intermixed at ratios close to the stoichiometric composition, and as a result a highly crystalline lithium-manganese complex oxide can be obtained.

The drying temperature should be a temperature at which the aqueous solvent will evaporate and is not otherwise particularly limited, but drying can be carried out at preferably 50° C. to 100° C. and more preferably 60 to 90° C., for example, at a temperature of approximately 80° C. By drying the starting material mixture in the temperature range below 100° C., the aqueous solvent is volatilized and conversion to a gel state lacking fluidity can be brought about.

With regard to the drying time, the thorough development of diffusion or impregnation of the individual components can be brought about generally by a lengthy holding period, but there are no particular limitations on the holding time. Thus, the holding time can be suitably adjusted while checking the state of solvent drying. With regard to the drying method, good drying can be carried out using suitable drying means, for example, spontaneous drying, hot wind, low-humidity wind, vacuum, infrared, far infrared, and so forth.

<The Pre-Calcination Step>

The pre-calcination step will now be described. The starting material mixture prepared by mixing with the aqueous solvent is subjected to a pre-calcination. The heating temperature during pre-calcination is generally 400° C. to 600° C., preferably 450° C. to 550° C., and ideally generally about 500° C. By carrying out pre-calcination by heating in the indicated temperature range, a uniform diffusion of the starting material mixture gel can be brought about while inhibiting rapid crystal growth. In addition, micrograin crystals of the lithium-manganese complex oxide are stably grown at or near the stoichiometric composition by calcination at a higher temperature range, described below.

<Grinding>

After the aforementioned pre-calcination, the pre-calcined material is ground using suitable means. A calcined material having a desired average particle size and/or BET specific surface area is obtained by grinding the pre-calcined material and then calcining it at high temperature. There are no particular limitations on the apparatus used for grinding, but this apparatus can be exemplified by a mortar, ball mill, rotor mill, kneader, and so forth. Grinding may be carried out by a wet method or a dry method or a combination thereof.

<Calcination>

The ground pre-calcined material is then calcined by heating at a temperature higher than the pre-calcination temperature. With regard to the calcination temperature, heating is carried out in a temperature range higher than the pre-calcination temperature. Generally this is a temperature in a range above 600° C. but at most 1000° C., and is preferably 700 to 950° C. and more preferably 800 to 900° C. Heating is generally carried out in a temperature range that is at least 100° C. higher, preferably at least 200° C. higher, and more preferably at least 400° C. higher than the temperature during pre-calcination. By heating at this calcination temperature, crystal growth is further promoted and the layered rocksalt-type crystal structure of the lithium-manganese complex oxide is formed at a composition ratio at or near the stoichiometric composition.

The average particle size (median size) based on laser diffraction measurement of the particle size distribution of the calcined material provided by the calcination step can generally be a microparticulate state of 1 μm to 10 μm, for example, about 1 μm to 8 p.m. The BET specific surface area of the calcined material can generally be at least 2 $m^2/g$ and preferably from 2 $m^2/g$ to 10 $m^2/g$. The calcined material having such an average particle size or BET specific surface area can exhibit excellent properties (capacity, high energy density) as a positive electrode active material for use in a battery used in a repetitive high-rate charge-discharge regime. The average particle size (D50) refers to the median size on a volume basis (D50: 50% volume-average particle size) and is measured using the usual commercially available particle size analyzers (instrument that measures the particle size distribution by laser diffraction). The BET specific surface area is measured using a commercial measurement instrument (for example, a computer-controlled fully automatic instrument for measuring the BET specific surface area).

The calcined material may be subjected to additional grinding as necessary. A powder of the lithium-manganese complex oxide granulate having a desired average particle size and/or BET specific surface area can be obtained by subjecting the aforementioned calcined material to grinding, granulation, and classification by appropriate means.

An embodiment of a positive electrode that uses as its positive electrode active material a lithium-manganese complex oxide obtained by the herein disclosed production method and an embodiment of a lithium secondary battery equipped with this positive electrode will be described in the following with reference to the schematic drawings shown in FIG. 1 and FIG. 2; however, the present invention is not intended to be limited to these embodiments.

In addition, matters required for the execution of the present invention, but not included in the matters particularly described in this Description (for example, the structure and method of producing the electrode assembly provided with the positive electrode and negative electrode, the structure and method of producing the separator and electrolyte, the general technology related to the fabrication of lithium secondary batteries and other batteries), can be understood as design matters for the individual skilled in the art based on the conventional art in the pertinent field.

In the figures below, members and components that have the same functions are assigned the same reference numbers and duplicate descriptions are either omitted or abbreviated. In addition, the dimensional relationships (length, width, thickness, and so forth) in each figure do not reflect actual dimensional relationships.

Figure 1:
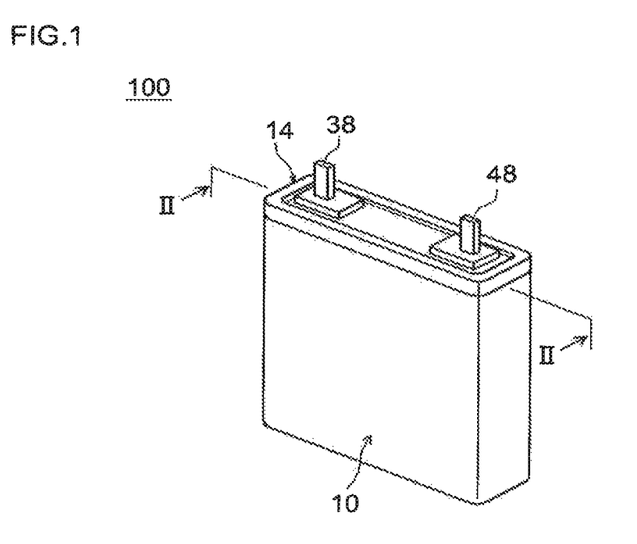
FIG. 1 is a perspective drawing that schematically illustrates the outer shape of a lithium secondary battery according to an embodiment.
Figure 2:
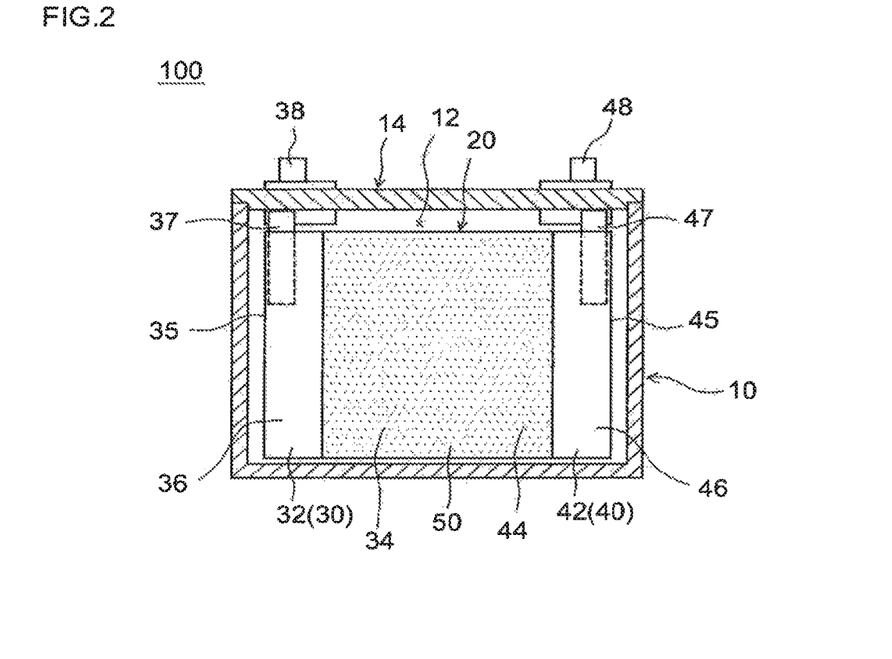
FIG. 2 is a cross-sectional drawing along the line in FIG. 1.

FIG. 1 is a perspective drawing that schematically illustrates an embodiment of a prismatic lithium secondary battery, while FIG. 2 is a cross-sectional diagram at the line in FIG. 1. As shown in FIG. 1 and FIG. 2, the lithium secondary battery 100 according to this embodiment is provided with a prismatic battery case 10 having a rectangular parallelepiped shape and with a lid 14 that closes the opening 12 of the case 10. A flat electrode assembly (wound electrode assembly 20) and an electrolyte can be packed within the battery case 10 through the opening 12. In addition, a positive electrode terminal 38 and a negative electrode terminal 48 for external connection are disposed in the lid 14, and a portion of each terminal 38, 48 extends out on the surface side of the lid 14. A portion of each outer terminal 38, 48 is connected, respectively, to the inner positive electrode terminal 37 and the inner negative electrode terminal 47 within the case.

As shown in FIG. 2, a wound electrode assembly 20 is accommodated within the case 10 in this embodiment. This electrode assembly 20 comprises a positive electrode sheet 30 in which a positive electrode active material layer 34 is formed on the surface of a long-sheet-shaped positive electrode current collector 32, a negative electrode sheet 40 in which a negative electrode active material layer 44 is formed on the surface of a long-sheet-shaped negative electrode current collector 42, and a long-sheet-shaped separator 50. The positive electrode sheet 30 and the negative electrode sheet 40 are wound layered with two separators 50, and a flat shape is formed by flattening the resulting wound electrode assembly 20 from the side surface direction.

At the wound positive electrode sheet 30, one edge 35 running along its length direction has a region in which the positive electrode active material layer 34 is not formed and the positive electrode current collector 32 is thereby exposed (the positive electrode active material layer-free region 36); at the wound negative electrode sheet 40, one edge 46 running along its length direction also has a region in which the negative electrode active material layer 44 is not formed and the negative electrode current collector 42 is thereby exposed (the negative electrode active material layer-free region 46). An inner positive electrode terminal 37 is joined to the positive electrode active material layer-free region 36 of the positive electrode current collector 32, and an inner negative electrode terminal 47 is joined to the negative electrode active material layer-free region 46 of the negative electrode current collector 42, and these are electrically connected to the positive electrode sheet 30 or the negative electrode sheet 40 of the wound electrode assembly 20 that has been made into a flat shape. The positive and negative electrode terminals 37, 47 can be joined to the positive and negative electrode current collectors 32, 42 by, for example, ultrasound welding or resistance welding.

The positive electrode sheet (typically the positive electrode sheet 30) is provided with a structure in which the positive electrode active material layer 34, which contains the positive electrode active material, is formed on the long-sheet-shaped positive electrode current collector 32. Aluminum foil or another metal foil suitable for the positive electrode is advantageously used for the positive electrode current collector 32. A lithium-manganese complex oxide obtained by the herein disclosed production method can be used for the positive electrode active material.

In addition to the previously described positive electrode active material, the positive electrode active material layer 34 can as necessary contain, for example, one or two or more binders and/or electroconductive materials as may be incorporated in a typical lithium secondary battery. An electroconductive particulate material, e.g., carbon powder, carbon fiber, and so forth, is preferably used as this electroconductive material. For example, acetylene black, furnace black, Ketjen black, and graphite powder are preferred, and only a single one of these may be used or two or more may be used in combination.

This positive electrode active material layer 34 can be fabricated preferably by adding the positive electrode active material, binder, electroconductive material, and so forth, to a suitable solvent (water, organic solvent, and their mixed solvents); dispersing or dissolving to produce a paste or slurry composition; coating this composition on the positive electrode current collector 32; and drying off the solvent and compressing.

The negative electrode (typically the negative electrode sheet 40), on the other hand, can be a structure in which the negative electrode active material layer 44 is formed on the long-sheet-shaped negative electrode current collector 42 (for example, copper foil). A single material or two or more materials as heretofore used in lithium secondary batteries can be used without particular limitation for the negative electrode active material. Carbon particles are a preferred example. A particulate carbon material (carbon particles) containing a graphite structure (layered structure) in at least a portion is preferably used. Any of the following carbon materials can also be favorably used: graphitic carbon materials (graphite), graphitization-resistant carbonaceous materials (hard carbon), easy-to-graphitize carbonaceous materials (soft carbon), and carbon materials having a structure in which the preceding are combined.

In addition to the previously described negative electrode active material, the negative electrode active material layer 44 can as necessary contain, for example, one or two or more materials, e.g., binders, as may be incorporated in a typical lithium secondary battery. This negative electrode active material layer 44 can be fabricated preferably by adding the negative electrode active material, binder, and so forth, to a suitable solvent (water, organic solvent, and their mixed solvents); dispersing or dissolving to produce a paste or slurry composition; coating this composition on a negative electrode current collector 42; and drying off the solvent and compressing.

A separator constructed of a porous polyolefin resin is an example of a favorable separator sheet 50 for use between the positive and negative electrode sheets 30, 40. For example, a porous separator sheet made of a synthetic resin (for example, made of a polyolefin such as polyethylene) can be advantageously used. When a solid electrolyte or a gel electrolyte is used as the electrolyte, a separator may not be necessary (that is, in this case the electrolyte itself can function as the separator).

The same nonaqueous electrolytes as heretofore used in lithium secondary batteries can be used without particular limitation as the electrolyte. This nonaqueous electrolyte generally has a composition provided by the introduction of a supporting electrolyte into a suitable nonaqueous solvent. This nonaqueous solvent can be exemplified by propylene carbonate (PC), ethylene carbonate (EC), diethyl carbonate (DEC), dimethyl carbonate (DMC), ethyl methyl carbonate (EMC), and so forth. A single one of these or two or more may be used. For example, a lithium compound (lithium salt), e.g., $LiPF_6$, $LiBF_4$, $LiClO_4$, $LiAsF_6$, and so forth, can be used as the aforementioned supporting electrolyte.

A general procedure for fabricating the lithium secondary battery 100 according to an embodiment will now be described. The above-described fabricated positive electrode sheet 30 and negative electrode sheet 40 are stacked with two separators 50 and this is wound and flattened from the stacking direction to form a flat electrode assembly 20, which is packed in a battery case 10. The electrolyte is introduced and the lid 14 is then mounted and sealed on the case opening 12 to fabricate the lithium secondary battery 100 according to this embodiment. There are no particular limitations on the structure, size, and materials of the battery case 10 (for example, it can be made of metal or a laminate film) or on the structure of the battery assembly (for example, a wound structure or a laminate structure) in which the positive and negative electrodes are the main constituent elements.

Figure 3:
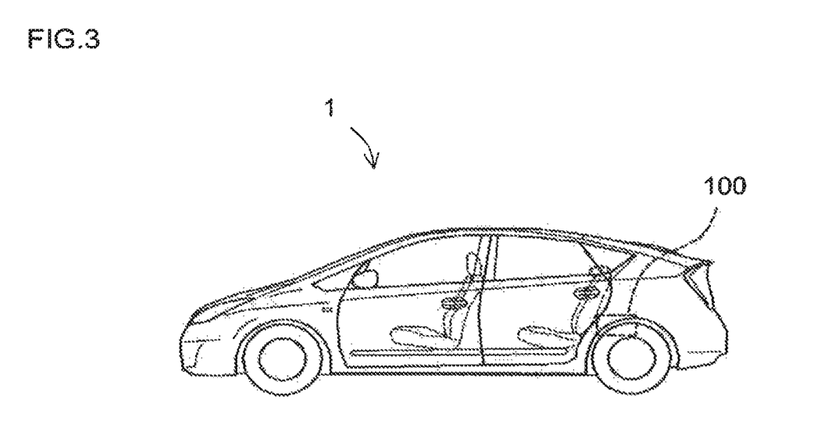
FIG. 3 is a side view that schematically illustrates a vehicle (an automobile) that is equipped with a lithium secondary battery according to an embodiment.

The lithium secondary battery 100 fabricated in this manner is thus a battery in which the decline in the discharge capacity is inhibited—even during high-rate charge-discharge use. The lithium secondary battery 100 according to the present invention can thus be favorably used as a vehicle-mounted high-output power source and particularly as a power source for a motor (electric motor) mounted in a vehicle, for example, an automobile. As shown schematically in FIG. 3, a vehicle (typically an automobile and particularly an automobile equipped with an electric motor, such as a hybrid automobile, an electric automobile, or a fuel cell automobile) 1 is provided that is equipped with this lithium secondary battery 100 (this can be a battery assembly configuration formed by connecting a plurality of these lithium secondary batteries 100 in series) as a power source.

Test examples relating to the present invention are described below, but the present invention is not intended to be limited to these specific examples.

TEST EXAMPLE 1 general formula: $Li_x(Mn_aCo_bNi_c)_{2-x-y}M_yO_2$ (1)

The following were synthesized: lithium-manganese complex oxides containing, for the element M in formula (1), an element (Al, Ca, Fe, or Zr) that has a larger bond energy with oxygen than Mn, Co, or Ni; lithium-manganese complex oxides containing, for the element M in formula (1), an element (Zn or Mg) that has a smaller bond energy with oxygen than Mn, Co, and Ni; and a lithium-manganese complex oxide lacking an element M.

EXAMPLE 1

Synthesis of Lithium-Manganese Complex Oxide (M=Al)

Among the lithium-manganese complex oxides represented by formula (1), $Li_2Mn_{0.52}Co_{0.13}Ni_{0.13}Al_{0.02}O_2$, in which the element M is Al, was synthesized in Example 1.

Thus, lithium acetate dihydrate ($Li(CH_3COO).2H_2O$), nickel (II) acetate tetrahydrate ($Ni(CH_3COO)_2.4H_2O$), manganese (II) acetate tetrahydrate ($Mn(CH_3COO)_2.4H_2O$), and aluminum acetate ($Al(CH_3COO)_3$) were prepared as the starting materials, and these were each weighed out so the mixing mass ratios provided the component ratios indicated above. The weighed out starting materials were mixed in an aqueous solvent with glycolic acid ($C_2H_4O_3$) as the organic acid followed by drying overnight with a dryer to produce a starting material mixture in gel form. Pre-calcination was then carried out by heating the dried starting material mixture for 5 hours at 500° C. Pre-calcination was followed by wet grinding with a planetary ball mill and calcination by heating for 5 hours at 900° C. to synthesize the lithium-manganese complex oxide ($Li_{1.2}Mn_{0.52}Co_{0.13}Ni_{0.13}Al_{0.02}O_2$) according to Example 1.

EXAMPLE 2

Synthesis of Lithium-Manganese Complex Oxide (M=Ca)

Among the lithium-manganese complex oxides represented by formula (1), $Li_{1.2}Mn_{0.52}CO_{0.13}Ni_{0.13}Ca_{0.02}O_2$, in which the element M in formula (1) is Ca, was synthesized in Example 2.

Thus, the lithium-manganese complex oxide ($Li_{1.2}Mn_{0.52}CO_{0.13}Ni_{0.13}Ca_{0.02}O_2$) according to Example 2 was synthesized by the same procedure as in Example 1 above, but using calcium acetate dihydrate ($Ca(CH_3COO)_2 \cdot 2H_2O$) as a starting material in place of the aluminum acetate.

EXAMPLE 3

Synthesis of Lithium-Manganese Complex Oxide (M=Fe)

Among the lithium-manganese complex oxides represented by formula (1), $Li_{1.2}Mn_{0.52}CO_{0.13}Ni_{0.13}Fe_{0.02}O_2$, in which the element M in formula (1) is Fe, was synthesized in Example 3.

Thus, the lithium-manganese complex oxide ($Li_{1.2}Mn_{0.52}CO_{0.13}Ni_{0.13}Fe_{0.02}O_2$) according to Example 3 was synthesized by the same procedure as in Example 1 above, but using iron acetate ($Fe(CH_3COO)_2$) as a starting material in place of the aluminum acetate.

EXAMPLE 4

Synthesis of Lithium-Manganese Complex Oxide (M=Zr)

Among the lithium-manganese complex oxides represented by formula (1), $Li_{1.2}Mn_{0.52}CO_{0.13}Ni_{0.13}Zr_{0.02}O_2$, in which the element M in formula (1) is Zr, was synthesized in Example 4.

Thus, the lithium-manganese complex oxide ($Li_{1.2}Mn_{0.52}CO_{0.13}Ni_{0.13}Zr_{0.02}O_2$) according to Example 4 was synthesized by the same procedure as in Example 1 above, but using zirconium oxychloride octahydrate ($ZrOCl_2 \cdot 8H_2O$) as a starting material in place of the aluminum acetate.

COMPARATIVE EXAMPLE 1

Synthesis of Lithium-Manganese Complex Oxide (M=Not Present)

Among the lithium-manganese complex oxides represented by formula (1), $Li_{1.2}Mn_{0.54}CO_{0.13}Ni_{0.13}O_2$, in which the element M in formula (1) is not incorporated, was synthesized in Comparative Example 1.

Thus, the lithium-manganese complex oxide ($Li_{1.2}Mn_{0.54}Co_{0.13}Ni_{0.13}O_2$) according to Comparative Example 1 was synthesized by the same procedure as in Example 1 above, but omitting the aluminum acetate from the starting materials.

COMPARATIVE EXAMPLE 2

Synthesis of Lithium-Manganese Complex Oxide (M=Zn)

Among the lithium-manganese complex oxides represented by formula (1), $Li_{1.2}Mn_{0.52}CO_{0.13}Ni_{0.13}Zn_{0.02}O_2$, in which the element M in formula (1) is Zn, was synthesized in Comparative Example 2.

Thus, the lithium-manganese complex oxide ($Li_{1.2}Mn_{0.52}CO_{0.13}Ni_{0.13}Zn_{0.02}O_2$) according to Comparative Example 2 was synthesized by the same procedure as in Example 1 above, but using zinc acetate ($Zn(CH_3COO)_2$) as a starting material in place of the aluminum acetate.

COMPARATIVE EXAMPLE 3

Synthesis of Lithium-Manganese Complex Oxide (M=Mg)

Among the lithium-manganese complex oxides represented by formula (1), $Li_{1.2}Mn_{0.52}Co_{0.13}Ni_{0.13}Mg_{0.02}O_2$, in which the element M in formula (1) is Mg, was synthesized in Comparative Example 3.

Thus, the lithium-manganese complex oxide ($Li_{1.2}Mn_{0.52}Co_{0.13}Ni_{0.13}Mg_{0.02}O_2$) according to Comparative Example 3 was synthesized by the same procedure as in Example 1 above, but using magnesium acetate tetrahydrate ($Mg(CH_3COO)_2 \cdot 4H_2O$) as a starting material in place of the aluminum acetate.

[XRD Analysis]

The crystal structure of the lithium-manganese complex oxides synthesized in the examples and comparative examples were analyzed with a powder x-ray diffraction analyzer (XRD). Each of the x-ray diffraction patterns is shown in FIG. 4.

Figure 4:
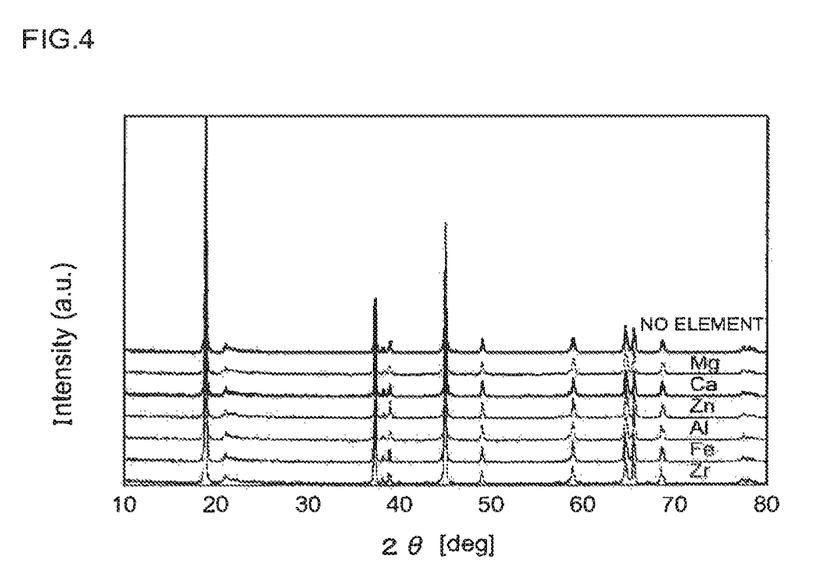
FIG. 4 is a diagram that shows the x-ray diffraction patterns of individual lithium-manganese complex oxides.

According to the x-ray patterns shown in FIG. 4, in all instances the peak for an Mn-containing compound around a 2θ value of about 22° could be confirmed for the crystal structure of the lithium-manganese complex oxides according to Examples 1 to 4 and Comparative Examples 1 to 3.

In addition, it was shown that all of the lithium-manganese complex oxides had formed solid solutions based on the peak seen at a 2θ value around approximately 18° or 65°.

[Measurement of the Average Particle Size and the Bet Specific Surface Area]

For each of the lithium-manganese complex oxides synthesized in the examples and comparative examples, the BET specific surface area was measured and the average particle size (median size) was measured based on laser diffraction measurement of the particle size distribution. The measurement results are shown in Table 1.

TABLE 1

|  | Example 1 | Example 2 | Example 3 | Example 4 | Comp. Example 1 | Comp. Example 2 | Comp. Example 3 |
|---|---|---|---|---|---|---|---|
| D50 [μm] | 2.3 | 2.3 | 1.9 | 3.4 | 3.2 | 3.63 | 1.6 |
| BET specific surface area [m²/g] | 3.58 | 3.74 | 2.98 | 3.45 | 3.32 | 1.83 | 3.99 |

[Lithium Secondary Battery Fabrication]

Test lithium secondary batteries were then fabricated. The positive electrode used in these batteries was first produced. Thus, a lithium-manganese complex oxide synthesized as described above and serving as the positive electrode active material, acetylene black serving as the electroconductive material, and polyvinylidene fluoride (PVDF) serving as a binder were weighed out so as to bring the mass % ratio of these materials to 85:10:5; N-methyl-2-pyrrolidone (NMP) was added; and a paste for forming the positive electrode active material layer was produced by mixing.

This paste was coated on an aluminum foil serving as the positive electrode current collector and the moisture fraction in the paste was dried off (evaporated). An active material layer was formed on the surface of the positive electrode current collector by extension into a sheet shape using a roller press. A positive electrode was produced by punching into a circular shape with a punch having a diameter of 15 mm.

A negative electrode for the test lithium secondary batteries was then produced. Lithium metal foil was prepared and punched with a punch with a diameter of 15 mm to produce the negative electrode.

A 2032 (diameter=20 mm, thickness=3.2 mm) coin-type test lithium secondary battery was fabricated using the positive electrode and negative electrode produced as described above. Thus, the circular positive electrode and a separator impregnated with nonaqueous electrolyte were layered into the interior of an outer can that formed the exterior on the positive electrode side; the outer edge of the separator was restrained with a gasket; and the circular negative electrode, a spacer for thickness adjustment, and a plate spring were placed on the separator in the indicated sequence. The interior of the thusly loaded outer can was closed with an outer lid and the test lithium secondary battery was fabricated by sealing the outer edges of the outer can and outer lid.

A composition prepared by dissolving 1 mol/L LiPF$_6$ in a 3:3:4 (volumetric ratio) mixed solvent of ethylene carbonate (EC), dimethyl carbonate (DMC), and ethyl methyl carbonate (EMC) was used as the nonaqueous electrolyte.

[Measurement of the Discharge Capacity]

The discharge capacity was measured on the individual test lithium secondary batteries fabricated as described above. Thus, each battery was charged at 25° C. to an upper limit voltage of 4.3 V at a constant current of 3 A/g for the current density, and the discharge capacity of each battery was then measured by discharge to 2.5 V at the same current density. The relationship among the measured discharge capacity, the element M added to the lithium-manganese complex oxide, and the bond energy is shown in FIG. 5.

Figure 5:
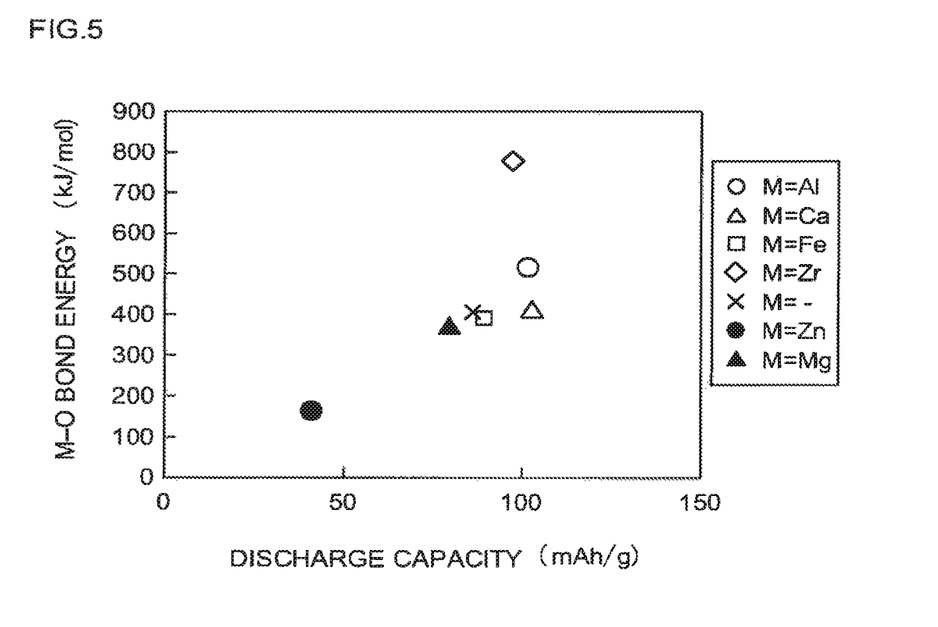
FIG. 5 is a diagram that shows the relationship among the element M added to the lithium-manganese complex oxide, the bond energy with oxygen, and the discharge capacity of the lithium secondary battery fabricated using this oxide.

As shown in FIG. 5, the discharge capacities of the lithium secondary batteries fabricated using the lithium-manganese complex oxides according to Examples 1 to 4, which contained as the element M in formula (1) an element (Al, Ca, Fe, or Zr) having a larger bond energy with oxygen than Mn, Co, or Ni, were larger than the discharge capacities of the lithium secondary batteries fabricated using the lithium-manganese complex oxides according to Comparative Examples 2 and 3, which contained an element (Zn or Mg) having a bond energy with oxygen smaller than Mn, Co, and Ni, and were shown to have excellent battery characteristics. Considering that the numerical value of the discharge capacity of the lithium secondary battery fabricated using the lithium-manganese complex oxide according to Comparative Example 1, which lacked an element M, was about equal to the discharge capacity of the lithium secondary battery fabricated using the lithium-manganese complex oxide according to Example 3, which used Fe as the element M, it was also shown that an element M with a larger bond energy with oxygen gave a higher discharge capacity.

TEST EXAMPLE 2 general formula: $Li_x(Mn_aCo_bNi_c)_{2-x-y}M_yO_2$ (1)

Lithium-manganese complex oxides were synthesized that contained Al, which has a larger bond energy with oxygen than Mn, Co, or Ni, as the element M in formula (1); these lithium-manganese complex oxides had different aluminum component ratios (a).

EXAMPLE 5

Synthesis of Lithium-Manganese Complex Oxide (a=0.003)

Among the lithium-manganese complex oxides represented by formula (1), $Li_{1.2}Mn_{0.52}Co_{0.127}Ni_{0.13}Al_{0.003}O_2$, in which the Al component ratio a=0.003, was synthesized in Example 5.

Thus, lithium acetate dihydrate (Li(CH$_3$COO).2H$_2$O), nickel (II) acetate tetrahydrate (Ni(CH$_3$COO)$_2$.4H$_2$O), manganese (II) acetate tetrahydrate (Mn(CH$_3$COO)$_2$.4H$_2$O), and aluminum acetate (Al(CH$_3$COO)$_3$) were prepared as the starting materials, and these were each weighed out so the mixing mass ratios provided the component ratios indicated above. The weighed out starting materials were mixed in an aqueous solvent with glycolic acid (C$_2$H$_4$O$_3$) as the organic acid followed by drying overnight with a dryer to produce a starting material mixture in gel form. Pre-calcination was then carried out by heating the dried starting material mixture for 5 hours at 500° C. Pre-calcination was followed by wet grinding with a ball mill and calcination by heating for 5 hours at 900° C. to synthesize the lithium-manganese complex oxide ($Li_{1.2}Mn_{0.52}Co_{0.127}Ni_{0.13}Al_{0.003}O_2$) according to Example 5.

EXAMPLE 6

Synthesis of Lithium-Manganese Complex Oxide (a=0.005)

Among the lithium-manganese complex oxides represented by formula (1), $Li_{1.2}Mn_{0.52}Co_{0.125}Ni_{0.13}Al_{0.005}O_2$, in which the Al component ratio a=0.005, was synthesized in Example 6.

Thus, lithium acetate dihydrate (Li(CH$_3$COO).2H$_2$O), nickel (II) acetate tetrahydrate (Ni(CH$_3$COO)$_2$.4H$_2$O), manganese (II) acetate tetrahydrate (Mn(CH$_3$COO)$_2$.4H$_2$O), and aluminum acetate (Al(CH$_3$COO)$_3$) were prepared as the starting materials, and these were each weighed out so the mixing mass ratios provided the component ratios indicated above. The weighed out starting materials were mixed in an aqueous solvent with glycolic acid (C$_2$H$_4$O$_3$) as the organic acid followed by drying overnight with a dryer to produce a starting material mixture in gel form. Pre-calcination was then carried out by heating the dried starting material mixture for 5 hours at 600° C. Pre-calcination was followed by wet grinding with a mortar and calcination by heating for 5 hours at 800° C. to synthesize the lithium-manganese complex oxide (Li$_{1.2}$Mn$_{0.52}$Co$_{0.125}$Ni$_{0.13}$Al$_{0.005}$O$_2$) according to Example 6.

EXAMPLE 7

Synthesis of Lithium-Manganese Complex Oxide (a=0.008)

Among the lithium-manganese complex oxides represented by formula (1), Li$_{1.2}$Mn$_{0.52}$Co$_{0.22}$Ni$_{0.13}$Al$_{0.008}$O$_2$, in which the Al component ratio a=0.008, was synthesized in Example 7.

Thus, the lithium-manganese complex oxide (Li$_{1.2}$Mn$_{0.52}$Co$_{0.122}$Ni$_{0.13}$Al$_{0.008}$O$_2$) according to Example 7 was synthesized by the same procedure as in Example 5 above, with the exception that the component ratio for the aluminum acetate (Al(CH$_3$COO)$_3$) used as a starting material was changed.

EXAMPLE 8

Synthesis of Lithium-Manganese Complex Oxide (a=0.026)

Among the lithium-manganese complex oxides represented by formula (1), Li$_{1.2}$Mn$_{0.52}$Co$_{0.104}$Ni$_{0.13}$Al$_{0.026}$O$_2$, in which the Al component ratio a=0.026, was synthesized in Example 8.

Thus, the lithium-manganese complex oxide (Li$_{1.2}$Mn$_{0.52}$Co$_{0.104}$Ni$_{0.13}$Al$_{0.026}$O$_2$) according to Example 8 was synthesized by the same procedure as in Example 5 above, with the exception that the component ratio for the aluminum acetate (Al(CH$_3$COO)$_3$) used as a starting material was changed.

Test lithium secondary batteries were fabricated as in Test Example 1 above using the lithium-manganese complex oxides synthesized as described above for the positive electrode active material and the discharge capacities were measured. Specifically, the discharge capacity of each battery was measured in the range from 4.3 V to 2.5 V after carrying out 1 cycle where a cycle was charging to the upper limit voltage of 4.8 V at a constant current of 150 mA/g for the current density and discharging to 2.5 V at a constant current of 50 mA/g for the current density. The measurement results are shown in Table 2.

TABLE 2

|  | Example 5 | Example 6 | Example 7 | Example 8 | Comp. Example 1 |
|---|---|---|---|---|---|
| discharge capacity [mAh/g] | 113.2 | 105.1 | 108.4 | 100.3 | 86 |

As shown in Table 2, the discharge capacity was at least 100 mAh/g in all instances for the lithium secondary batteries fabricated using lithium-manganese complex oxides that contained Al, which has a larger bond energy with oxygen than Mn, Co, or Ni, as the element M in formula (1), but which had different Al component ratios (a), and it was confirmed that these discharge capacities were larger than the discharge capacity of a lithium secondary battery fabricated using the lithium-manganese complex oxide according to Comparative Example 1, which did not contain the element M. In addition, the lithium-manganese complex oxide according to Example 5 was shown to provide a positive electrode active material for a lithium secondary battery, that had a discharge capacity approximately 30% larger than that for the positive electrode active material according to Comparative Example 1, which lacked the element M.

While the present invention has been described in detail in the preceding, the previously described embodiments and examples are nothing more than examples, and the herein disclosed present invention encompasses various modifications and alterations of the specific examples provided above. For example, various battery internals may be used as provided by using different electrode assembly constituent materials and electrolytes. In addition, the size of this battery and its other structures may also be modified as appropriate in accordance with the particular application (typically for in-vehicle applications).

INDUSTRIAL APPLICABILITY

A lithium secondary battery fabricated using as its positive electrode active material a lithium-manganese complex oxide obtained according to the method of the present invention is, as described above, resistant to a reduction in discharge capacity even during high-rate charge-discharge service and as a consequence can in particular be favorably used as a power source for a motor (electric motor) mounted in a vehicle, e.g., an automobile. Accordingly, as shown schematically in FIG. 3, the present invention provides a vehicle 1 (typically an automobile and particularly an automobile equipped with an electric motor, such as a hybrid automobile, an electric automobile, or a fuel cell automobile) that is equipped with this lithium secondary battery (typically a battery assembly formed by connecting a plurality in series) 100 as a power source.

The invention claimed is:

1. A lithium secondary battery comprising a positive electrode provided with a positive electrode active material formed of a lithium-manganese complex oxide represented by the general formula $$Li_x(Mn_aCo_bNi_c)_{2-x-y}M_yO_2 \qquad (1)$$

where, a, b, and c are 0.5<a<0.65, 0<b, 0≤c(2−x−y)≤0.13, and a+b+c=1, and x and y are 1<x≤1.2 and 0.001<y<0.03, with the element M being Ca, wherein the lithium-manganese complex oxide consists of Li, Mn, Co, Ni, M and O, the lithium-manganese complex oxide is the only positive electrode active material of the lithium secondary battery, and an X-ray diffraction pattern measured by a powder diffractometer (XRD) has a peak attributable to an Mn-containing compound recognized at a position for 2θ in the vicinity of 22°.

2. A method of producing a positive electrode comprising a positive electrode active material formed of a lithium-manganese complex oxide, this production method comprising the following steps:

a step of preparing a starting material mixture by mixing, in an aqueous solvent, an organic acid and starting materials for forming a lithium-manganese complex oxide represented by the general formula $$Li_x(Mn_aCo_bNi_c)_{2-x-y}M_yO_2 \qquad (1)$$

where, a, b, and c are 0.5<a<0.65, 0<b, 0≤c(2−x−y)≤0.13, and a+b+c=1, and x and y are 1<x≤1.2 and 0.001<y<0.03, with the element M being Ca;

a step of heating the starting material mixture and drying off the aqueous solvent;

a step of pre-calcining the starting material mixture after the aqueous solvent has been dried off;

a step of grinding the pre-calcined material and calcining the same at a temperature higher than the pre-calcination temperature; and a step of forming the positive electrode comprising the positive electrode active material, wherein the lithium-manganese complex oxide consists of Li, Mn, Co, Ni, M and O, the lithium-manganese complex oxide is the only positive electrode active material of a lithium secondary battery including a positive electrode provided with the positive electrode active material, and an X-ray diffraction pattern measured by a powder diffractometer (XRD) has a peak attributable to an Mn-containing compound recognized at a position for 2θ in the vicinity of 22°.

3. The production method according to claim 2, wherein the pre-calcination in the pre-calcination step is carried out at 400 to 600° C.

4. The production method according to claim 3, wherein calcination is carried out in the calcination step at a temperature above the pre-calcination temperature but at most 1000° C.

5. The production method according to claim 4, wherein the average particle size (median size) of the calcined material obtained after implementing the calcination step is 1 μm to 10 μm based on measurement of the particle size distribution by laser diffraction.

6. The production method according to claim 4, wherein the BET specific surface area of the calcined material obtained after implementing the calcination step is at least 2 m²/g.

7. A vehicle comprising the lithium secondary battery according to claim 1.

* * * * *